US010303717B2

(12) United States Patent
Ishii

(10) Patent No.: US 10,303,717 B2
(45) Date of Patent: May 28, 2019

(54) SEARCH SYSTEM, SEARCH METHOD AND PROGRAM RECORDING MEDIUM

(71) Applicant: NEC Corporation, Minato-ku, Tokyo (JP)

(72) Inventor: Masato Ishii, Tokyo (JP)

(73) Assignee: NEC CORPORATION, Tokyo (JP)

( * ) Notice: Subject to any disclaimer, the term of this patent is extended or adjusted under 35 U.S.C. 154(b) by 258 days.

(21) Appl. No.: 15/114,930

(22) PCT Filed: Feb. 9, 2015

(86) PCT No.: PCT/JP2015/000574
§ 371 (c)(1),
(2) Date: Jul. 28, 2016

(87) PCT Pub. No.: WO2015/118887
PCT Pub. Date: Aug. 13, 2015

(65) Prior Publication Data
US 2016/0350416 A1    Dec. 1, 2016

(30) Foreign Application Priority Data

Feb. 10, 2014  (JP) .................................. 2014-023402

(51) Int. Cl.
*G06F 17/00* (2006.01)
*G06F 16/683* (2019.01)
(Continued)

(52) U.S. Cl.
CPC .......... *G06F 16/683* (2019.01); *G06F 16/583* (2019.01); *G06F 16/637* (2019.01);
(Continued)

(58) Field of Classification Search
CPC .................................................... G06F 16/683
See application file for complete search history.

(56) References Cited

U.S. PATENT DOCUMENTS 8,032,507 B1 * 10/2011 Bayardo ............. G06F 17/3069
707/706
2002/0147754 A1 * 10/2002 Dempsey ............. G06K 9/6215
708/671
2005/0086210 A1    4/2005 Kita et al.

FOREIGN PATENT DOCUMENTS

JP   2005-011042 A    1/2005
JP   2011-221689 A   11/2011
(Continued)

OTHER PUBLICATIONS

Kohei Inoue, "Filtering Retrieval Based on Upper Bound of Correlation between Images", The Institute of Image Information and Television Engineers, Technical Report, Nov. 20, 2003, vol. 27, No. 65, pp. 23-28.
(Continued)

*Primary Examiner* — Etienne P Leroux
*Assistant Examiner* — Farhad Agharahimi

(57) ABSTRACT

Provided is a search system which is configured to search for a registered vector being similar to an input vector among a plurality of registered vectors, on the basis of a degree of similarity between an input vector and a registered vector. The search system includes a partial similarity calculation unit that calculates a degree of partial similarity which is the degree of similarity concerning some of one or more dimensions of the input vector and the registered vector, a limit calculation unit that calculates, on the basis of the degree of partial similarity, an upper limit of the degree of similarity that is expected when the degree of similarity is calculated, and a rejection decision unit that decides, on the basis of the upper limit of the degree of similarity, whether or not to reject the registered vector from a candidate for a search result.

10 Claims, 10 Drawing Sheets

(51) Int. Cl.
*G06F 16/635* (2019.01)
*G06F 17/30* (2006.01)
*G06K 9/62* (2006.01)
*G06F 16/583* (2019.01)

(52) U.S. Cl.
CPC .. *G06F 17/30743* (2013.01); *G06F 17/30766* (2013.01); *G06K 9/6223* (2013.01)

(56) References Cited

FOREIGN PATENT DOCUMENTS

| | | |
|---|---|---|
| JP | 2012-063959 A | 3/2012 |
| JP | 2013-211026 A | 10/2013 |

OTHER PUBLICATIONS

International Search Report for PCT Application No. PCT/JP2015/000574, dated May 12, 2015.
English translation of Written opinion for PCT Application No. PCT/JP2015/000574.

* cited by examiner

SEARCH SYSTEM, SEARCH METHOD AND PROGRAM RECORDING MEDIUM

This application is a National Stage Entry of PCT/JP2015/000574 filed on Feb. 9, 2015, which claims priority from Japanese Patent Application 2014-023402 filed on Feb. 10, 2014, the contents of all of which are incorporated herein by reference, in their entirety.

TECHNICAL FIELD

The present invention relates to pattern retrieval.

BACKGROUND ART

In the fields of image processing or speech processing, a process is performed in which a registered pattern most similar to an input pattern is searched for from a database that stores a plurality of registered patterns. The process is called pattern retrieval.

Patterns are often represented as feature vectors. A search system performing pattern retrieval calculates the similarity between a feature vector of an input pattern and a feature vector of each registered pattern. The search system then outputs a registered pattern that has a high degree of similarity as a result of the search.

If the number of registered patterns in the database is huge, simple repetition of calculation of the degree of similarity between an input pattern and registered patterns by the search system requires a huge computation cost. To avoid this, a method for speeding up the search process is required.

Methods for speeding up the search process are mainly classified into two types. One method is approximate nearest neighbor search and the other method is cascading.

Approximate nearest neighbor search, represented by Locally Sensitive Hashing (LSH) or Spectral Hashing, will be described first. In the approximate nearest neighbor search, a search system transforms a feature vector into an index and calculates the degree of similarity between an input pattern and each of only those registered patterns that have the same index as the input pattern. This reduces the number of similarity calculations required to be performed by the search system, thereby enabling the search system to perform faster search. In such a search method, the accuracy and speed of search largely depend on how indices are created. PTL1 and PTL2 disclose examples of the method of this type. Approximate nearest neighbor search can be explained as above.

Cascading will be described as following. In the cascading, a search system uses low-dimensional feature vectors to calculate degrees of similarity and rejects registered patterns that have the degrees of similarity lower than or equal to a threshold. The search system repeats the operation and calculates, by using all dimensions, the degrees of similarity of only registered patterns that finally have not been rejected. Because much of the registered data are rejected by similarity calculation performed with low dimensions, the search system can perform fast search. While the threshold is typically determined through learning in advance, the threshold may be determined in accordance with registered patterns as in the search method disclosed in PTL3, for example. Cascading can be explained as above.

CITATION LIST

Patent Literature

[PTL1]: Japanese Laid-open Patent Publication No. 2011-221689

[PTL2]: Japanese Laid-open Patent Publication No. 2012-63959

[PTL 3]: Japanese Laid-open Patent Publication No. 2005-11042

SUMMARY OF INVENTION

Technical Problem

Hereinafter, in this disclosure, search processing for finding, in a database, "K" registered vectors that have high degrees of similarity to an input pattern given as a search condition, will be referred to as k-nearest neighbor search. The degree of matching between "K" registered patterns found by simply repeating calculation of the degree of similarity between an input pattern and each registered pattern, and "K" registered patterns found by a fast search method will be referred to as the "k-nearest neighbor accuracy rate" of the search method. The higher the k-nearest neighbor accuracy rate, the more accurate the search method is. Accordingly, a search method that achieves a high k-nearest neighbor accuracy rate and a high search speed is a desirable search method.

A problem with the search methods disclosed in PTL1 and PTL2 is that the "k-nearest neighbor accuracy rate" can be decreased in some cases. In the search methods disclosed in PTL1 and PTL2, a guarantee of the k-nearest neighbor accuracy rate is probabilistic. This is because it is in principle impossible to speed up approximate nearest neighbor search without any degradation of the k-nearest neighbor accuracy rate of the nearest neighbor search. For applications in which high accuracy of search is essential (for example, authentication applications such as face authentication or voice authentication), the accuracy of the search methods disclosed in PTL1 and PTL2 can be insufficient.

A problem with the search method disclosed in PTL3 is that in principle only Euclidian distance can be used as the measure of the degree of similarity.

One object of the present invention is to provide a search system, a search method and a program recording medium in which the measure of the degree of similarity that can be used is not limited to Euclidean distance and that are capable of speeding up a search process without degrading the k-nearest neighbor accuracy rate.

Solution to Problem

The first aspect with regard to the present invention is a search system which is configured to search for a registered vector being similar to an input vector among a plurality of registered vectors on the basis of a degree of similarity which is a measure indicating a level of similarity between an input vector and a registered vector, the search system including: a partial similarity calculation unit for calculating a degree of partial similarity which is the degree of similarity concerning some of one or more dimensions of the input vector and the registered vector; a limit calculation unit for calculating, on the basis of the degree of partial similarity, an upper limit of the degree of similarity that is expected when the degree of similarity is calculated; and a rejection decision unit for deciding, on the basis of the upper limit of the degree of similarity, whether or not to reject the registered vector from a candidate for a search result.

The second aspect with regard to the present invention is a search method performed by a computer which is configured to search for a registered vector similar to an input vector among a plurality of registered vectors on the basis of a degree of similarity which is a measure indicating a level of similarity between an input vector and a registered vector, the search method including: calculating a degree of partial similarity which is the degree of similarity concerning some of one or more dimensions of the input vector and the registered vector; calculating, on the basis of the degree of partial similarity, an upper limit of the degree of similarity that is expected when the degree of similarity is calculated; and deciding, on the basis of the upper limit of the degree of similarity, whether or not to reject the registered vector from a candidate for a search result.

The third aspect with regard to the present invention is a program for causing a computer which is configured to search for a registered vector similar to an input vector among a plurality of registered vectors on the basis of a degree of similarity which is a measure indicating a level of similarity between an input vector and a registered vector, to perform the processing of: calculating a degree of partial similarity which is the degree of similarity concerning some of one or more dimensions of the input vector and the registered vector; calculating, on the basis of the degree of partial similarity, an upper limit of the degree of similarity that is expected when the degree of similarity is calculated; and deciding, on the basis of the upper limit of the degree of similarity, whether or not to reject the registered vector from a candidate for a search result.

The object of the present invention is also achieved by a computer-readable storage medium on which the program is stored.

Advantageous Effects of Invention

According to the present invention, a search system, a search method and a program recording medium in which the measure of the degree of similarity that can be used is not limited to Euclidean distance and that are capable of speeding up a search process without degrading the k-nearest neighbor accuracy rate, are provided.

DESCRIPTION OF EMBODIMENTS

Exemplary embodiments of the present invention will be described in detail below with reference to drawings.

Definitions of Terms

The term "the degree of similarity" is defined as follows. "The degree of similarity" is a measure representing what level of similarity exists between a given vector and another vector. For example, the degree of similarity may be inner product, Euclidean distance, or normalized correlation. Hereinafter, the degree of similarity between a feature vector extracted from a given pattern and a feature vector extracted from another pattern will be sometimes referred to as "the degree of similarity between a pattern and another pattern".

The phrase "the degree of similarity is high" means that a vector is similar to another vector. The phrase "the degree of similarity is low" means that a vector is dissimilar to another vector. The relationship between the magnitude of the value of the degree of similarity and the height of the degree of similarity varies depending on the definition of the degree of similarity. For example, if the degree of similarity is defined by inner product, the greater the value of the degree of similarity, the higher the degree of similarity. On the other hand, if the degree of similarity is defined by Euclidean distance, the smaller the value of the degree of similarity, the higher the degree of similarity.

To facilitate the understanding, search systems 100 according to the present exemplary embodiments will be described by referring to the height of degree of similarity, rather than the magnitude of the value of the degree of similarity. In the following description, description such like "process for comparing the degree of similarity with a threshold" will appear a number of times, and it is assumed that in the process, "the height of the degree of similarity" is compared with a "threshold indicating the height of the degree of similarity".

The term "the upper limit of the degree of similarity" or "the lower limit of the degree of similarity" as used herein does not mean the upper limit or lower limit of the value of the degree of similarity. The "upper limit of the degree of similarity" or the "lower limit of the degree of similarity" represents the upper limit or lower limit of the height of the degree of similarity.

First Exemplary Embodiment (Overview of Configuration)

Figure 1:
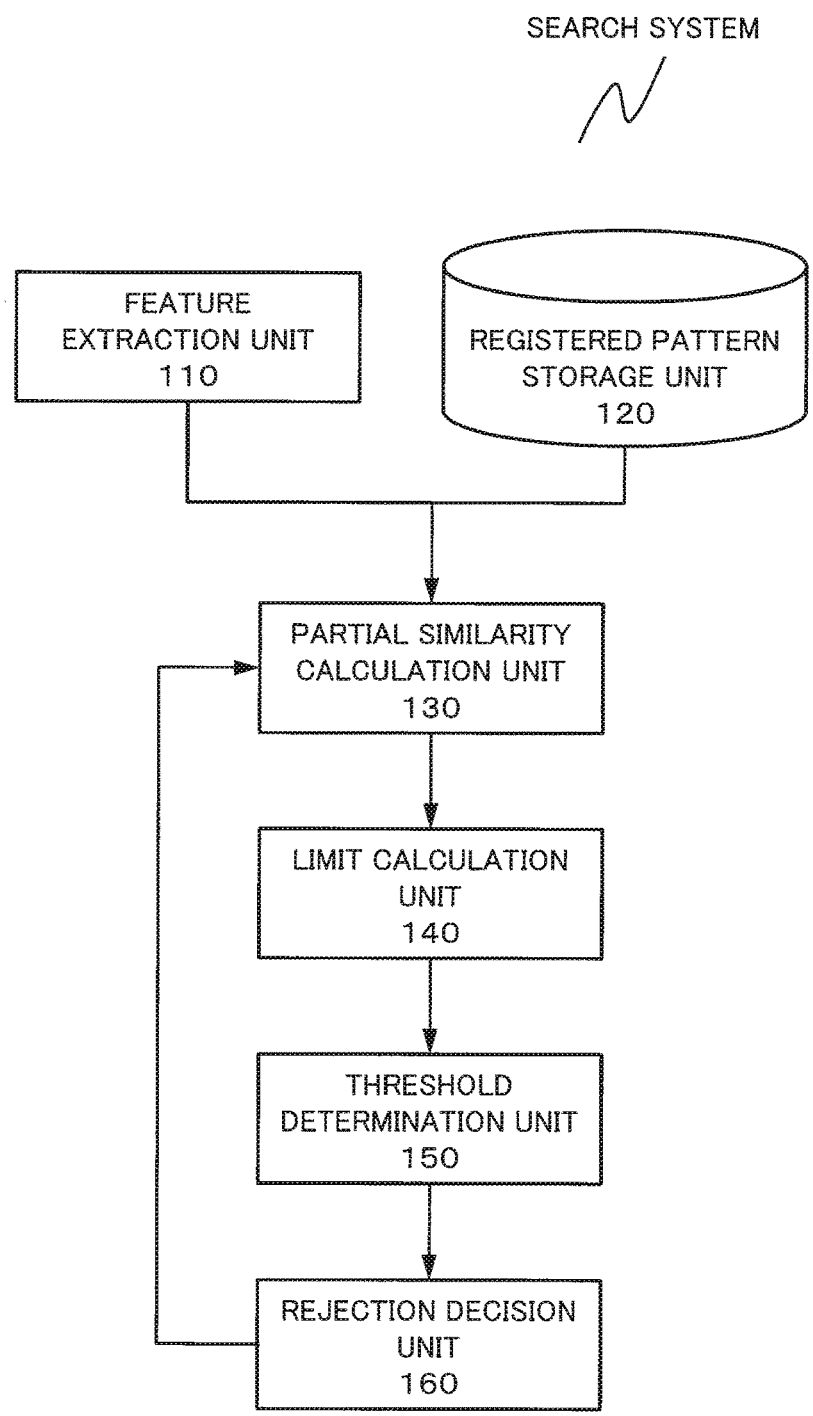
FIG. 1 is a block diagram illustrating a configuration of a search system 100 according to a first exemplary embodiment of the present invention.

FIG. 1 is a block diagram illustrating a configuration of a search system 100 according to a first exemplary embodiment. As illustrated in FIG. 1, the search system 100 includes a feature extraction unit 110, a registered pattern storage unit 120, a partial similarity calculation unit 130, a limit calculation unit 140, a threshold determination unit 150, and a rejection decision unit 160.

The search system 100 performs k-nearest neighbor search. Specifically, the search system 100 accepts an input of an input pattern and searches for and outputs "K" registered patterns that have high degrees of similarity to the input pattern among a plurality of registered patterns stored in the registered pattern storage unit 120. The value of K may be preset. The value of K may be input by an operator.

The feature extraction unit 110 extracts feature vectors from input patterns. The feature vectors are multidimensional vectors. Hereinafter, the number of dimensions of a feature vector will be denoted by "D". Hereinafter a feature pattern extracted from an input pattern will be referred to as an "input vector".

The registered pattern storage unit 120 stores a plurality of registered patterns. The registered pattern storage unit 120 may store registered patterns in association with feature vectors that correspond to the registered patterns. Hereinafter, a feature vector corresponding to a registered pattern will be referred to as a "registered vector". Hereinafter, the number of registered patterns stored in the registered pattern storage unit 120 will be denoted by N and the number of registered vectors will also be denoted by N. However, registered patterns and registered vectors do not necessarily need to be in a one-to-one relationship; the same registered vector may be associated with different registered patterns.

The partial similarity calculation unit 130 calculates the degree of partial similarity between an input vector extracted by the feature extraction unit 110 and a registered vector stored in the registered pattern storage unit 120. The degree of partial similarity is the degree of similarity between an input vector and a registered vector in terms of some of the dimensions of the input vector and the registered vector (i.e. D dimensions). Hereinafter, the number of "some of the dimensions" will be denoted by "d". Here, "1<d<D" is satisfied. The symbol "<" represents an inequality sign. The initial value of "d" will be hereinafter denoted by "d0".

An specific example of the degree of partial similarity will be described. Assume, for example, that input vectors and registered vectors are 100-dimensional vectors, i.e. D=100. Then the degree of partial similarity is the degree of similarity calculated using some of the 100 dimensions, for example, 10 dimensions (i.e. d=10), from the first dimension to the tenth dimension. In this case, the degree of partial similarity will be referred to as the "degree of partial similarity calculated at d=10".

The limit calculation unit 140 calculates an upper limit of the degree of similarity that is expected when the degree of similarity between the input vector and the registered vector is calculated on the basis of the degree of partial similarity calculated by the partial similarity calculation unit 130 (hereinafter simply referred to as the "upper limit of the degree of similarity"). For example, when the partial similarity calculation unit 130 has calculated the degree of partial similarity between an input vector and another registered vector at d=10, the limit calculation unit 140 calculates an expected upper limit of the degree of similarity between the input vector and the registered vector (i.e. the degree of similarity calculated at d=D=100).

The threshold determination unit 150 determines the minimum height of degree of similarity that is required for a registered vector to be selected as a search result. In other words, the threshold determination unit 150 determines the minimum height of degree of similarity that is required for a registered vector to be selected as one of the top K most similar registered vectors. Hereinafter the height of the degree of similarity determined by the threshold determination unit 150 will be referred to as a threshold. Specific processing performed by the threshold determination unit 150 varies among specific examples which will be described later. The threshold determination unit 150 will be detailed later.

The rejection decision unit 160 compares the upper limit of the degree of similarity calculated by the limit calculation unit 140 with the threshold determined by the threshold determination unit 150. When the upper limit of the degree of similarity is lower than the threshold, there is no possibility that the registered vector corresponding to the upper limit of the degree of similarity will be selected as a search result. The rejection decision unit 160 therefore rejects the registered pattern corresponding to the degree of similarity from a candidate for a search result.

(Description of Overview of Operation)

Figure 2:
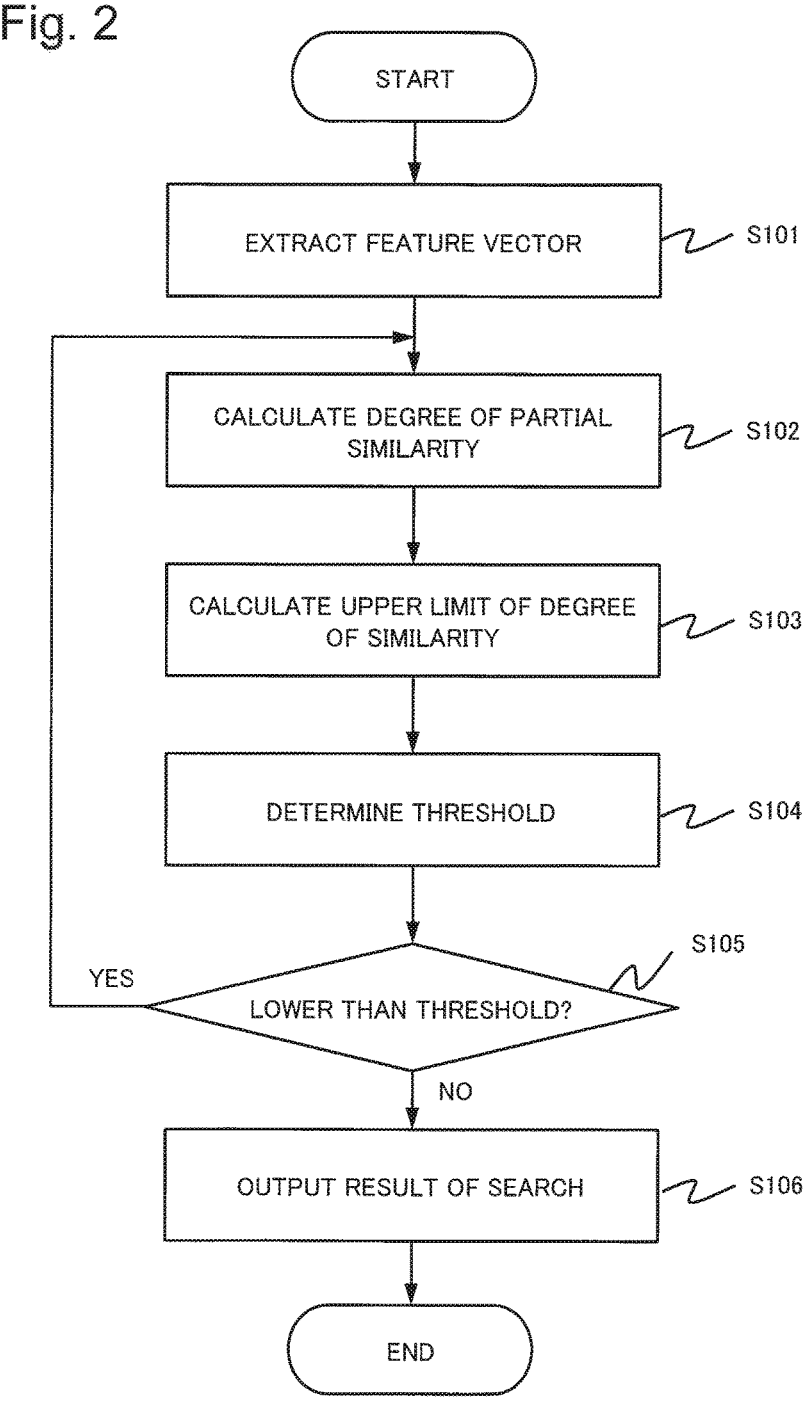
FIG. 2 is a flowchart illustrating an operation of the search system 100 according to the first exemplary embodiment of the present invention.

An overview of an operation of the search system 100 according to the first exemplary embodiment will be described with reference to the flowchart in FIG. 2.

The feature extraction unit 110 extracts an input vector from an input pattern (step S101). The partial similarity calculation unit 130 calculates the degree of partial similarity between the input vector and a registered vector at d=d0 (step S102). The limit calculation unit 140 calculates the upper limit of the degree of similarity on the basis of the calculated degree of partial similarity (step S103). The threshold determination unit 150 determines the minimum height of the degree of similarity that is required for a registered vector to be selected as a result of the search as a threshold (step S104). The rejection decision unit 160 compares the upper limit of the degree of similarity calculated by the limit calculation unit 140 with the threshold determined by the threshold determination unit 150. When the upper limit of the degree of similarity is lower than the threshold, the rejection decision unit 160 rejects the registered pattern corresponding to the degree of similarity from a candidate for a search result (step S105).

Then the partial similarity calculation unit 130 updates the value of the variable "d" from the initial value "d0" to a greater value, "d1". Here, 1<d0<d1<=D is satisfied. The sign "<=" represents a less-than-or-equal-to sign. Then the partial similarity calculation unit 130, the limit calculation unit 140, the threshold determination unit 150 and the rejection decision unit 160 repeat the process illustrated from step S102 to step S105.

That is, the partial similarity calculation unit 130 calculates the degree of partial similarity of a registered pattern that has not been rejected by the rejection decision unit 160 anew at d=d1. The limit calculation unit 140, the threshold determination unit 150 and the rejection decision unit 160 perform anew the process described above for the calculated degree of partial similarity.

The search system 100 repeats the process described above until the value of the variable "d" is updated to d=D. Specifically, the search system 100 repeats the process described above until the partial similarity calculation unit 130 calculates the degree of partial similarity at d=D and the rejection decision unit 160 makes a decision. Note that the degree of partial similarity calculated at d=D is the degree of similarity itself. The search system 100 outputs "K" registered vectors that have not been rejected by the end of the search as the results of the search (step S106). The search system 100 may output "K" registered patterns corresponding to the registered vectors that have not been rejected by the end of the search.

Figure 3:
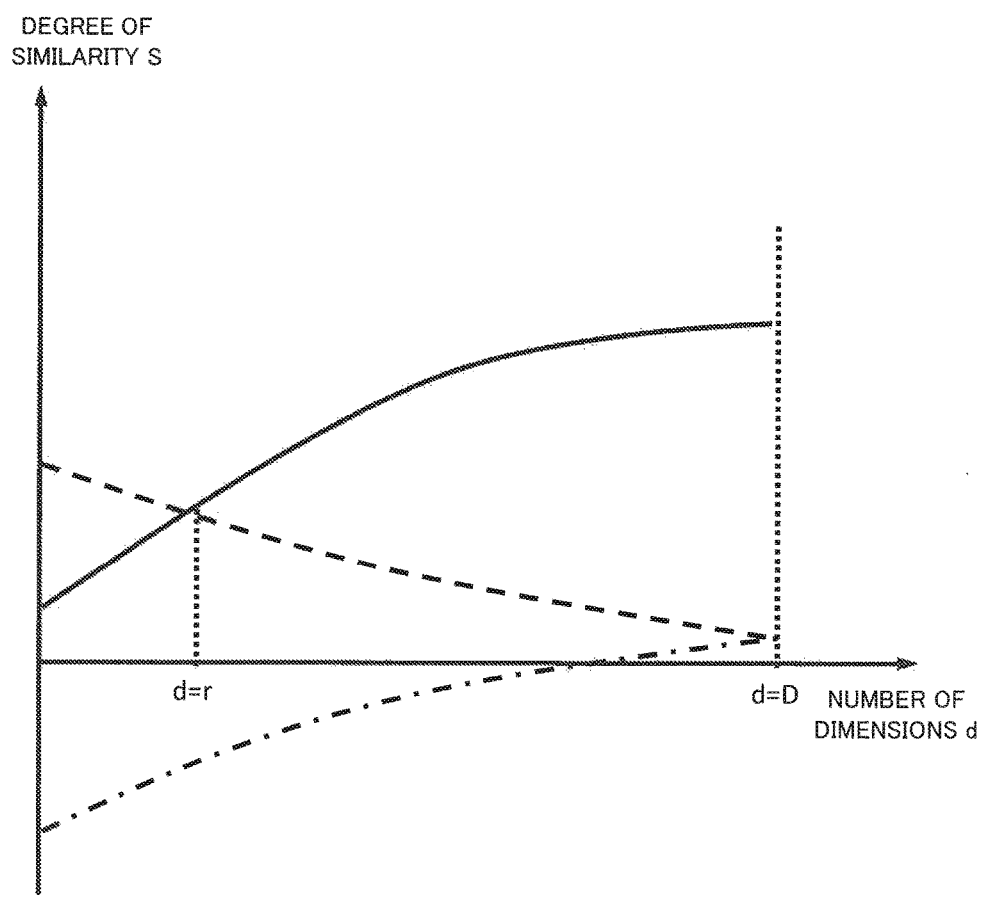
FIG. 3 is a diagram illustrating an overview of the search system 100 according to the first exemplary embodiment of the present invention.
Figure 4:
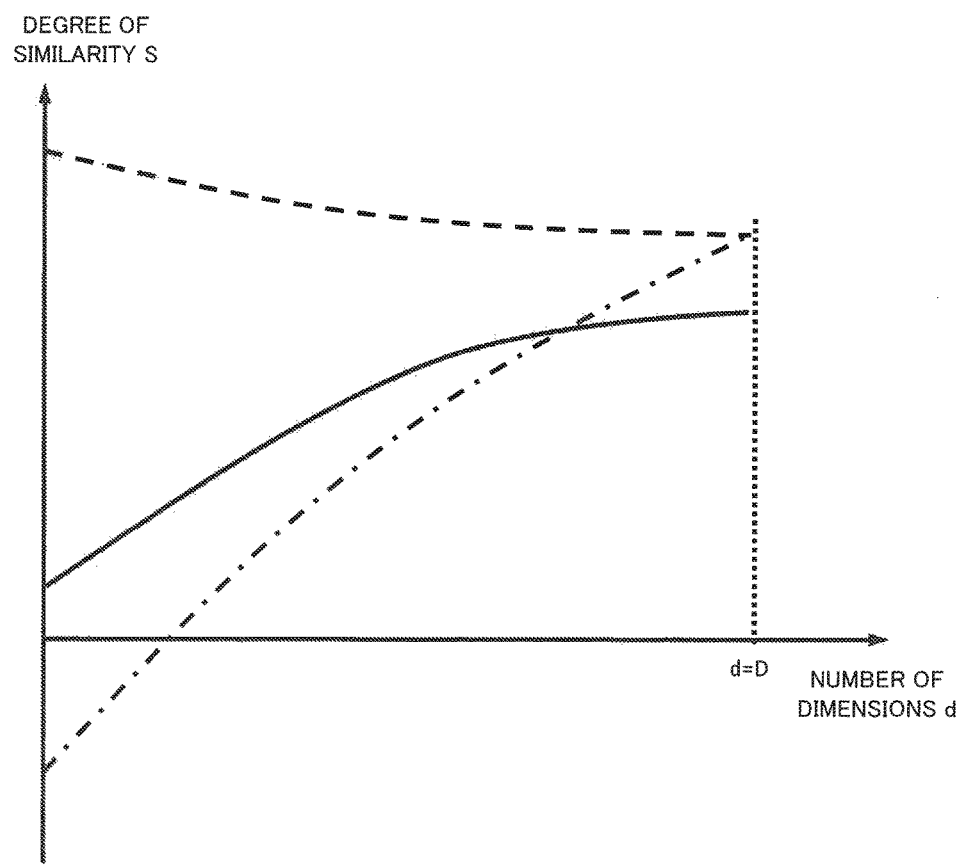
FIG. 4 is a diagram illustrating an overview of the search system 100 according to the first exemplary embodiment of the present invention.

FIGS. 3 and 4 are diagrams illustrating an overview of the present exemplary embodiment. In FIGS. 3 and 4, the horizontal axis represents the number of dimensions "d" used in calculating the degree of partial similarity. The vertical axis represents the height of the degree of similarity "S".

The curve illustrated by solid line in each of FIGS. 3 and 4 represents the minimum height of the degree of similarity required for a registered vector to be selected as a search result. In other words, the height represented by the curve illustrated by solid line represents the height of the threshold determined by the threshold determination unit 150 when the partial similarity calculation unit 130 has calculated the degree of partial similarity at the number of dimensions "d". The curves illustrated by solid line in FIGS. 3 and 4 are identical.

The curve illustrated by dashed line in each of FIGS. 3 and 4 represents an upper limit of the degree of similarity that is expected when the degree of partial similarity is calculated for a registered vector at the number of dimensions "d".

The curve illustrated by alternate long and short dashed line in each of FIGS. 3 and 4 represents a lower limit of the degree of similarity that is expected when the degree of partial similarity is calculated for a registered vector at the number of dimensions "d".

As illustrated in FIGS. 3 and 4, the upper limit of the degree of similarity decreases and the lower limit of the degree of similarity increases as the number of dimensions "d" increases. At d=D, the lower and upper limits of the degree of similarity converge to the same height as the height of the degree of similarity calculated using all dimensions. The degree of similarity calculated using all dimensions will be hereinafter sometimes referred to as the "final degree of similarity" in order to distinguish from the degrees of partial similarity.

FIG. 3 is a diagram illustrating a situation in which "registered vector 1", which is a specific example of registered vector, is rejected by the rejection decision unit 160. The upper limit (curve illustrated by dashed line) and lower limit (curve illustrated by alternate long and short dashed line) of the degree of similarity calculated for "registered vector 1" are illustrated in FIG. 3. In FIG. 3, the expected upper limit of the degree of similarity of registered vector 1 at d=r is lower than the minimum degree of similarity required for the registered vector to be selected as a search result. When the degree of partial similarity is calculated at d=r, the rejection decision unit 160 can determine that there is no possibility that registered vector 1 will be finally selected as a result of the search. It is therefore not effective to calculate the degree of partial similarity of registered vector 1 at a dimension number greater than d=r and the rejection decision unit 160 rejects registered vector 1 from a candidate for a search result.

FIG. 4 is a diagram illustrating a situation in which "registered vector 2", which is a specific example of registered vector, is not rejected by the rejection decision unit 160. The upper limit (curve illustrated by dashed) and lower limit (curve illustrated by alternate long and short dashed) of the degree of similarity calculated for "registered vector 2" are illustrated in FIG. 4. In FIG. 4, the expected upper limit of the degree of similarity of registered vector 2 is not lower than the minimum degree of similarity required for the registered vector to be selected as a search result regardless of the value of "d". Therefore, whether registered vector 2 will be finally selected as a search result cannot be determined before calculating the degree of similarity at d=D. In this case, the rejection decision unit 160 does not reject registered vector 2 and the partial similarity calculation unit 130 calculates the degree of similarity between the input vector and registered vector 2 at d=D.

Advantageous Effects of First Exemplary Embodiment

In this way, the search system 100 according to the first exemplary embodiment rejects only registered vectors that are unlikely to be selected as the results of search from the candidates for the search results. Therefore, according to the search method performed by the search system 100, the k-nearest neighbor accuracy rate does not degrade as compared with a search method in which calculation of the degree of similarity to an input pattern is simply repeated for registered patterns.

Further, for registered vectors that have been determined to be unlikely to be selected as search results, the search system 100 according to the first exemplary embodiment performs no further similarity calculation processing. In other words, for registered vectors that are unlikely to be selected as search results, the search system 100 performs processing for calculating the degrees of partial similarity for some of the dimensions of the registered vectors but does not perform processing, rather than calculating the degrees of similarity for all dimensions of the registered vectors. The amount of computation required for processing for calculating the degrees of partial similarity for some of the dimensions is smaller than the amount of computation required for processing for calculating the degrees of similarity for all dimensions, obviously. Therefore, according to the search method performed by the search system 100, the amount of computation can be reduced as compared with a search method in which calculation of the degree of similarity to an input pattern is simply repeated for registered patterns. Accordingly, the search method by the search system 100 can be performed fast.

Further, the search system 100 according to the first exemplary embodiment can be used with measures of degree of similarity that are defined in various ways, as will be illustrated later.

Moreover, in the search system 100, a value for "K" can be directly specified by an operator. In speeding up using the approximate nearest neighbor search or cascading in general, it is very difficult to adjust a parameter for achieving desired search accuracy for unknown input data. The search system 100 has the advantage that an operator can directly specify a value for "K" on the basis of a k-nearest neighbor accuracy rate to be guaranteed.

(Description about Exemplary Configuration of Hardware)

Figure 5:
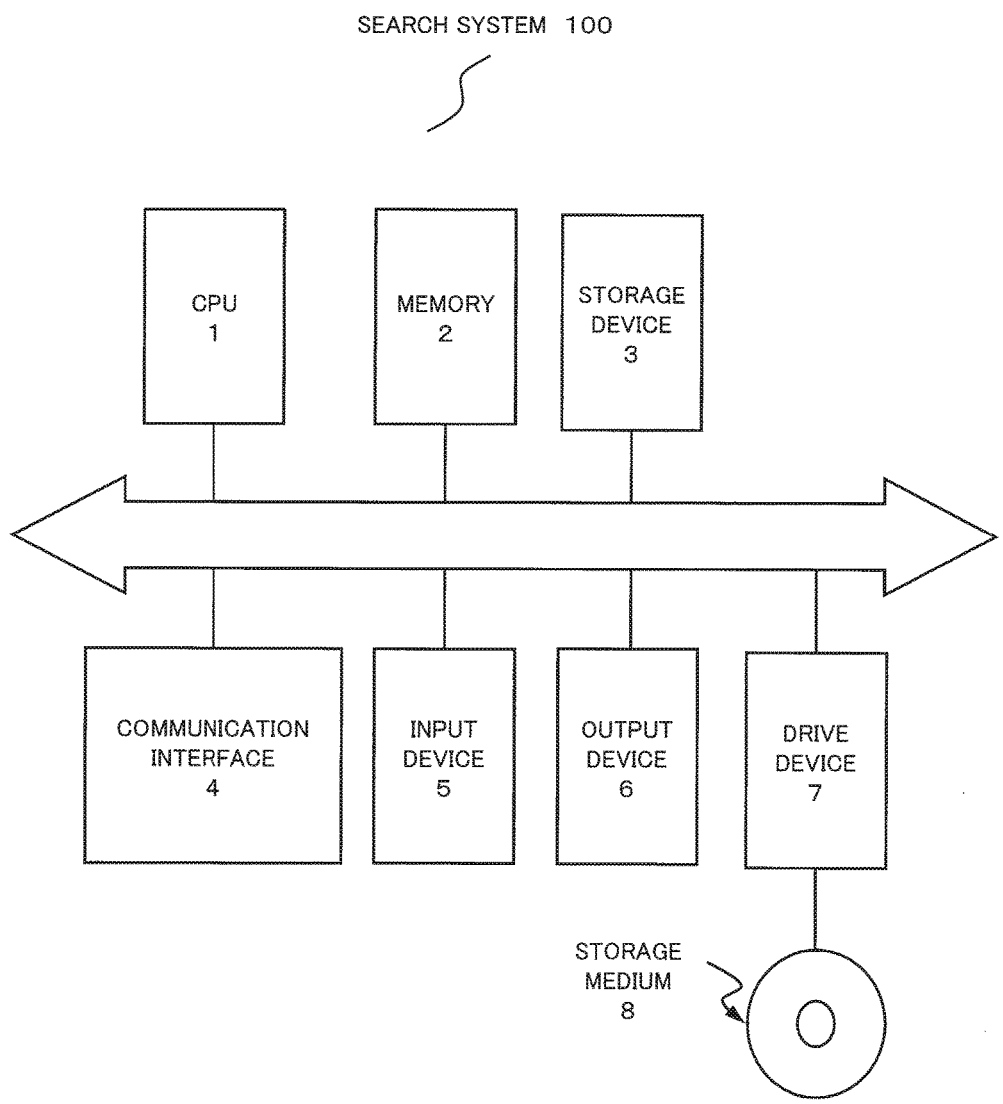
FIG. 5 is a diagram illustrating an exemplary hardware configuration of the search system 100 according to the first exemplary embodiment of the present invention.

FIG. 5 is a diagram illustrating an exemplary hardware configuration of the search system 100 according to the first exemplary embodiment. The hardware constituting the search system 100 (computer) includes a central processing unit (CPU) 1, a memory 2, a storage device 3, and a communication interface (I/F) 4. The search system 100 may include an input device 5 or an output device 6. The functions of the search system 100 are implemented, for example, by the CPU 1 executing a computer program (software program, which will be hereinafter simply referred to as the "program") loaded into the memory 2. During the execution, the CPU 1 controls the communication interface 4, the input device 5 and the output device 6 as appropriate.

Note that the present invention described by taking as examples the present exemplary embodiment and exemplary embodiments which will be described later may be configured using a nonvolatile storage medium 8 such as a compact disc on which the program is stored. The program stored on the storage medium 8 is read by a drive device 7, for example.

Communications by the search system 100 is implemented, for example, by an application program using functions provided by an operating system (OS) to control the communication interface 4.

The search system 100 may be made up of two or more physically separated apparatuses that are interconnected by wire or wirelessly.

The exemplary hardware configuration illustrated in FIG. 5 is also applicable to exemplary embodiments and specific examples which will be described below. The search system 100 may be a specialized apparatus. Note that the hardware configurations of the search system 100 and its functional blocks are not limited to the configurations described above.

SPECIFIC EXAMPLES

More specific modes of the search system 100 according to the first exemplary embodiment will be described using specific examples 1 to 5 given below. The specific examples described below are illustrative modes of the search system 100 and are not intended to limit the search system 100.

Specific Example 1

Details of a search system 100 according to specific example 1 will be described with reference to FIG. 1. In specific example 1, inner product is used as the measure of the degree of similarity. N registered patterns stored in a registered pattern storage 120 are processed in parallel in specific example 1.

The search system 100 performs k-nearest neighbor search.

A feature extraction unit 110 extracts an input vector from an input pattern.

The registered pattern storage unit 120 stores "N" registered patterns.

A partial similarity calculation unit 130 calculates the degree of partial similarity between the input vector extracted by the feature extraction unit 110 and a registered vector stored in the registered pattern storage unit 120. The partial similarity calculation unit 130 calculates the degree of partial similarity to each of the "N" registered vectors. The partial similarity calculation unit 130 therefore calculates "N" degrees of partial similarity.

A limit calculation unit 140 calculates the upper limit of the degree of similarity and the lower limit of the degree of similarity to each of the "N" registered vectors on the basis of the degree of partial similarity of the registered vector calculated by the partial similarity calculation unit 130. The limit calculation unit 140 therefore calculates "N" upper limits of the degree of similarity and "N" lower limits of the degree of similarity.

A threshold determination unit 150 sorts the "N" lower limits of the degree of similarity calculated by the limit calculation unit 140. The threshold determination unit 150 chooses the height of the "K"-th highest lower limit of the degree of similarity among the sorted "N" lower limits of the degree of similarity as a threshold. The threshold is the minimum height of the degree of similarity required for a registered vector to be selected as a search result. This is because, when the value of "d" is gradually increased and, reaches "d=D" (hereinafter this stage will be expressed as "final"), "K" registered patterns that have the degrees of similarity higher than the threshold, always exists.

A rejection decision unit 160 compares each upper limit of the degree of similarity calculated by the limit calculation unit 140 with the threshold determined by the threshold determination unit 150. When the upper limit of the degree of similarity is lower than the threshold, the rejection decision unit 160 rejects the registered pattern corresponding to the degree of similarity from a candidate for a search result.

In this specific example, an input vector is denoted by "x" and a registered vector is denoted by "y". Since the registered pattern storage unit 120 stores "N" registered vectors, each of the registered vectors is identified by a symbol, "$y_n$" (n=1, . . . , N). In the present specific example, a "D"-dimensional input vector is denoted by "x={x(i)} (i=1, . . . , D)". Similarly, a "D"-dimensional registered vector is denoted by "$y_n$={$y_n(i)$} (i=1, . . . , D)" in this specific example.

The degree of partial similarity "$S_d(x, y_n)$" between a "D"-dimensional input vector and a "D"-dimensional registered vector in some of the dimensions, "d", can be calculated as follows. In Equation 1, the sign "·" represents the product. The same applies to equations given hereinafter.

$$s_d(x, y_n) = \sum_{i=1}^{d} x(i) \cdot y_n(i) \quad \text{(Equation 1)}$$

For each of registered vectors that have not been rejected by the rejection decision unit 160, the partial similarity calculation unit 130 calculates the degree of partial similarity at d=d' (where d'>d) anew. The degrees of partial similarity $S_d(x, y_n)$ in this case are calculated in accordance with the following equation one by one.

$$s_{d'}(x, y_n) = s_d(x, y_n) + \sum_{i=d+1}^{d'} x(i) \cdot y_n(i) \quad \text{(Equation 2)}$$

The limit calculation unit 140 calculates the upper limit of the degree of similarity and the lower limit of the degree of similarity on the basis of the degree of partial similarity calculated by the partial similarity calculation unit 130. The inner product of D-dimensional vectors "x" and "y" in general has the upper and lower limits as given below. Here, "$x^T$" represents the transpose of the vector "x".

$$-\sqrt{\sum_{i=1}^{D} x(i)^2} \sqrt{\sum_{i=1}^{D} y(i)^2} \leq x^T y \leq \sqrt{\sum_{i=1}^{D} x(i)^2} \sqrt{\sum_{i=1}^{D} y(i)^2} \quad \text{(Equation 3)}$$

Therefore, the limit calculation unit 140 can calculate the upper and lower limits of the degree of similarity "SD(x, y)" at "D" dimension on the basis of the degree of partial similarity as given below.

$$s_d(x, y) - \sqrt{\sum_{i=d+1}^{D} x(i)^2} \sqrt{\sum_{i=d+1}^{D} y(i)^2} \leq \quad \text{(Equation 4)}$$

$$s_D(x, y) \leq s_d(x, y) + \sqrt{\sum_{i=d+1}^{D} x(i)^2} \sqrt{\sum_{i=d+1}^{D} y(i)^2}$$

Figure 6:
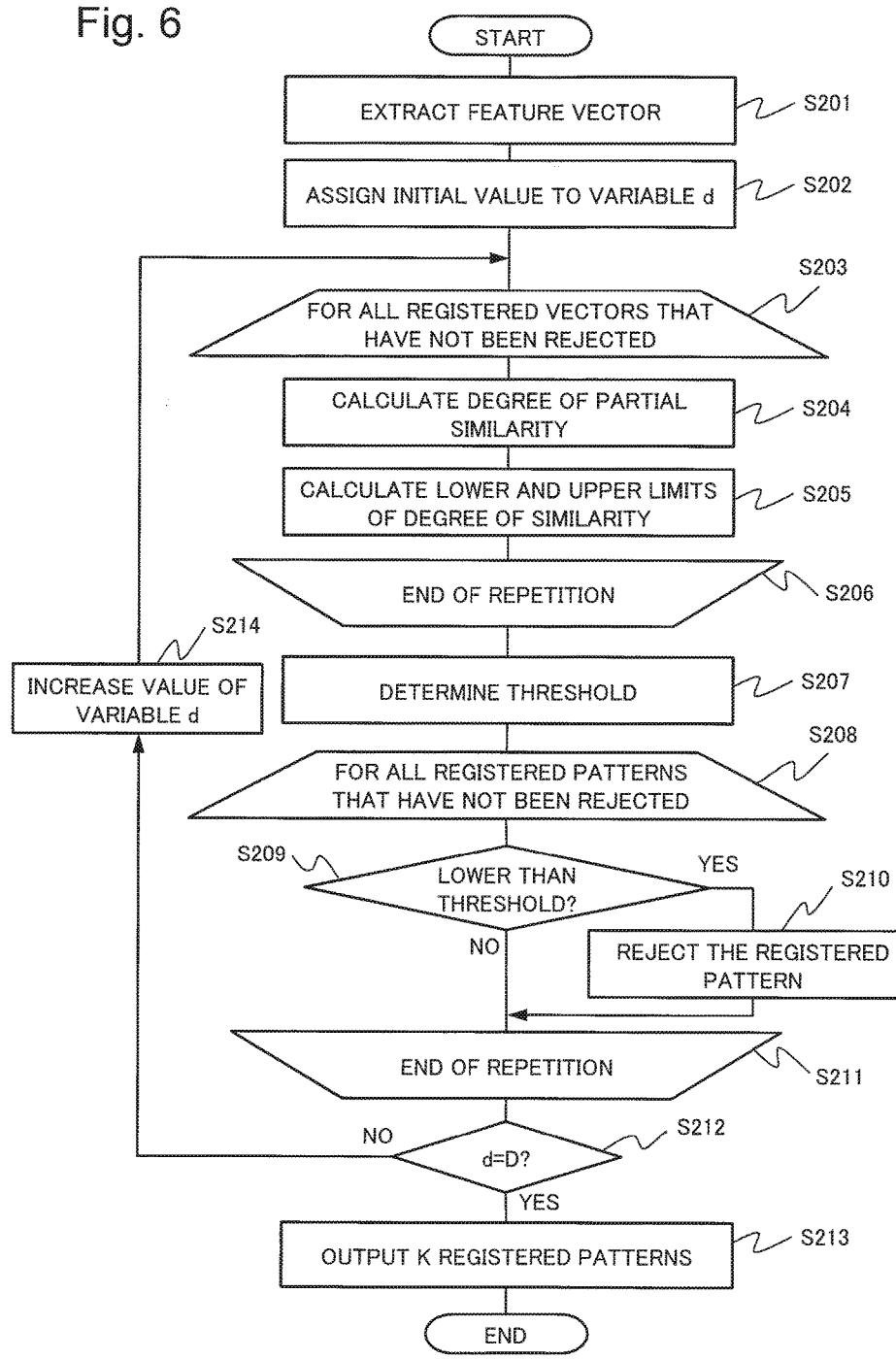
FIG. 6 is a flowchart illustrating an operation of a search system 100 according to specific example 1 of the present invention.

An operation of the search system 100 according to specific example 1 will be described with reference to the flowchart in FIG. 6. While a plurality of steps are illustrated in sequence in the flowchart in FIG. 6, the steps can be reordered within a scope which does not affect the operation.

A feature extraction unit 110 extracts an input vector from an input pattern (step S201). The partial similarity calculation unit 130 assigns an initial value "d0" to the variable "d" (step S202).

The partial similarity calculation unit 130 repeats the process from step S204 to step S205 for all of the registered vectors that have not been rejected (step S203). Because none of the registered vectors have been rejected in this stage, the partial similarity calculation unit 130 repeats the process for the "N" registered vectors stored in the registered pattern storage unit 120.

The partial similarity calculation unit 130 calculates the degree of partial similarity between an input vector and a registered vector (step S204). The limit calculation unit 140 calculates the upper limit of the degree of similarity and the lower limit of the degree of similarity on the basis of the degree of partial similarity (step S205).

The partial similarity calculation unit 130 performs the process from step S204 to S205 for the "N" registered vectors stored in the registered pattern storage unit 120. As a result, the limit calculation unit 140 is in a situation where the degree of partial similarity and the upper and lower limits of the degree of similarity for each of the "N" registered vectors (step S206) have been calculated.

The threshold determination unit 150 sorts the "N" lower limits of the degree of similarity calculated by the limit calculation unit 140. The threshold determination unit 150 chooses the height of the "K"-th highest lower limit of the degree of similarity among the sorted "N" lower limits of the degree of similarity as a threshold (step S207).

The rejection decision unit 160 repeats the process from step S209 to step S210 for all of the registered vectors that have not been rejected (step S208). Because none of the registered vectors have been rejected in this stage, the partial similarity calculation unit 130 repeats the process from step S209 to S210 for the "N" registered vectors stored in the registered pattern storage unit 120.

The rejection decision unit 160 compares each upper limit of the degree of similarity calculated by the limit calculation unit 140 with the threshold determined by the threshold determination unit 150 (step S209). When the upper limit of the degree of similarity is lower than the threshold (YES at step S209), the rejection decision unit 160 rejects the registered pattern corresponding to the degree of similarity from a candidate for a search result (step S210). When the upper limit of the degree of similarity is not lower than the threshold (NO at step S209), the rejection decision unit 160 does not reject the registered pattern corresponding to the degree of similarity from a candidate for a search result.

The rejection decision unit 160 repeats the process from step S209 to step S210 for all of the registered vectors that have not been rejected (step S211). As a result, the number of registered vectors that are candidates for results of the search is reduced from "N" to "N'" (N'<=N).

When the value of the variable "d" is equal to "D" (YES at step S212), the search system 100 outputs "K" registered vectors that have not been rejected as the results of the search (step S213). When the value of the variable "d" is not equal to "D" (NO at step S212), the partial similarity calculation unit 130 increases the value of "d". Then the partial similarity calculation unit 130, the limit calculation unit 140, the threshold determination unit 150 and the rejection decision unit 160 repeat the process from step S203 to step S211 for the "N" registered patterns that have not been rejected. The operation of the search system 100 according to specific example 1 has been described so far.

The reason why the search method performed by the search system 100 is faster than a search method in which the calculation of the degree of similarity to an input pattern is simply repeated for registered patterns will now be described in detail.

Assume, for example, that input vectors and registered vectors are 100-dimensional feature vectors (D=100). Further, for facilitating understanding, assume that the amount of calculation is proportional to the number of multiplications. If the degree of similarity is obtained by calculating the inner product in an ordinary manner, multiplication is performed at all dimensions, and in total 100 multiplications are performed. On the other hand, assume that, in the present specific example, the inner products are calculated, for example, up to 10 dimensions (d=10) and then rejection decision is performed. The amount of computation for the inner product calculation up to 10 dimensions is ten multiplications, and the amount of computation of each of the upper and lower limits is one multiplication. Accordingly, if elimination is performed at 10 dimensions, the amount of computation required is only 11 multiplications. Because many of the registered vectors are rejected after calculation of the degree of partial similarity at low dimensions, the amount of computation is reduced and the search processing is performed faster.

Note that the partial similarity calculation unit 130 can calculate the norm Equation 5 of the remaining dimensions used for calculating the upper and lower limits faster, in the following way, for example. The search system 100 can calculate the square value of each dimension (element) of each vector, i.e. the value of $x(i)^2$ or $y(i)^2$, in advance when extracting features from patterns. The partial similarity calculation unit 130 may read the values calculated in advance and may use the values in calculating the norms for the remaining dimensions. If a value of "d0", which is the initial value of "d", has been provided to the search system 100 in advance, the search system 100 may calculate and store the norms for the remaining dimensions in advance as background processing. When search is performed, the partial similarity calculation unit 130 may retrieve and use the values of the norms of the remaining dimensions that have been calculated in advance. In this way, the partial similarity calculation unit 130 can calculate the upper and lower limits fast.

$$\sqrt{\sum_{i=d+1}^{D} x(i)^2} \sqrt{\sum_{i=d+1}^{D} y(i)^2} \quad \text{(Equation 5)}$$

Specific Example 2

A search system 100 according to specific example 2 will be detailed with reference to FIG. 7. In specific example 2, inner product is used as the measure of the degree of similarity. "N" registered patterns stored in a registered pattern storage unit 120 are processed in sequence in specific example 2.

Figure 7:
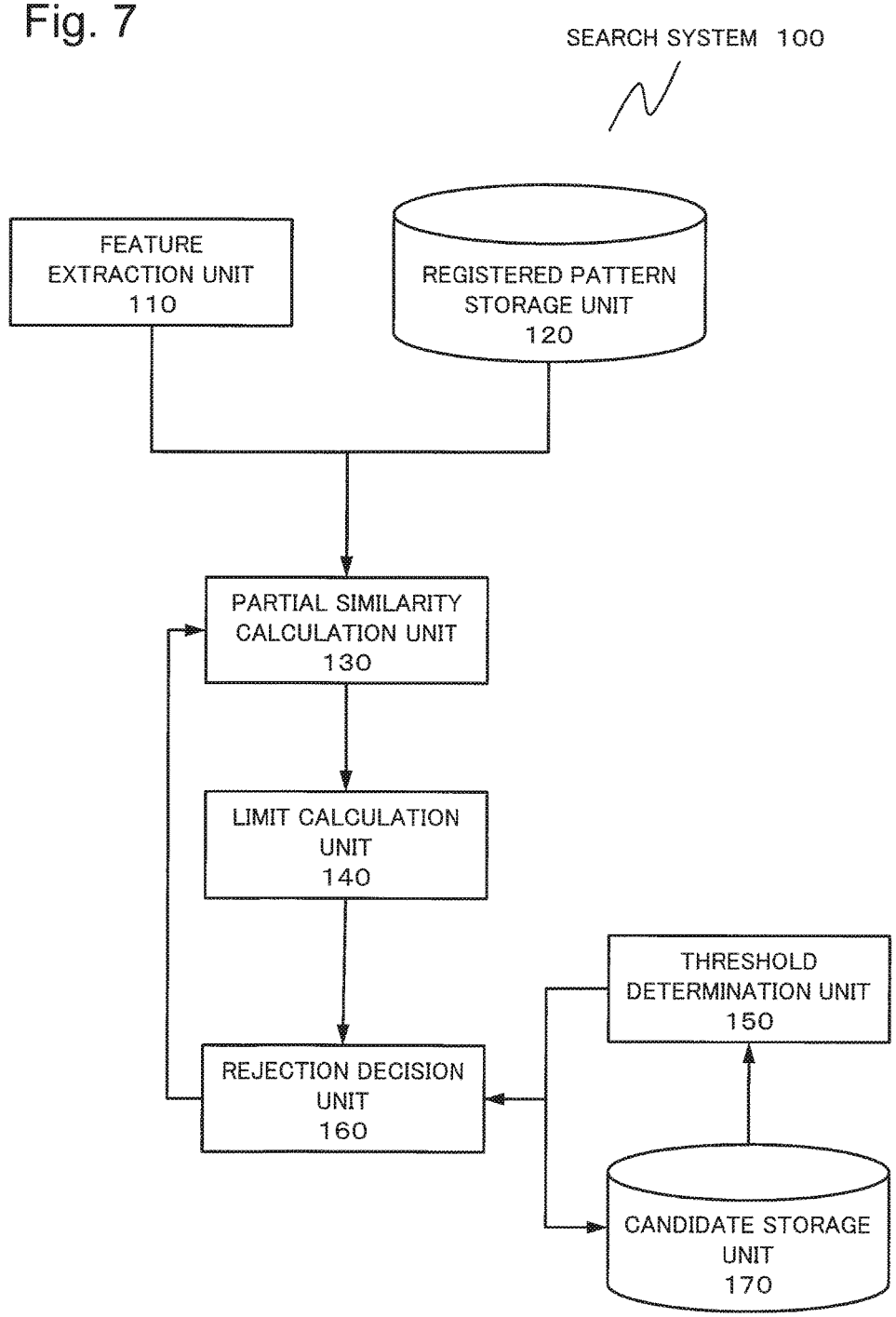
FIG. 7 is a block diagram illustrating a configuration of a search system 100 according to specific example 2 of the present invention.

FIG. 7 is a block diagram illustrating a configuration of the search system 100 according to specific example 2. As illustrated in FIG. 7, the search system 100 in specific example 2 includes a candidate storage unit 170

The candidate storage unit 170 stores the heights (or magnitudes) of at least "K" final degrees of similarity (i.e. the degrees of similarity calculated at d=D). Specifically, the candidate storage unit 170 stores "K" degrees of similarity, from the highest degree of similarity to the "K"-th highest degree of similarity, among at least "K" degrees of similarity calculated for at least "K" registered vectors. When a degree of similarity calculated is higher than the degrees of similarity stored in the candidate storage unit 170, the degrees of similarity stored in the candidate storage unit 170 are updated.

Figure 8:
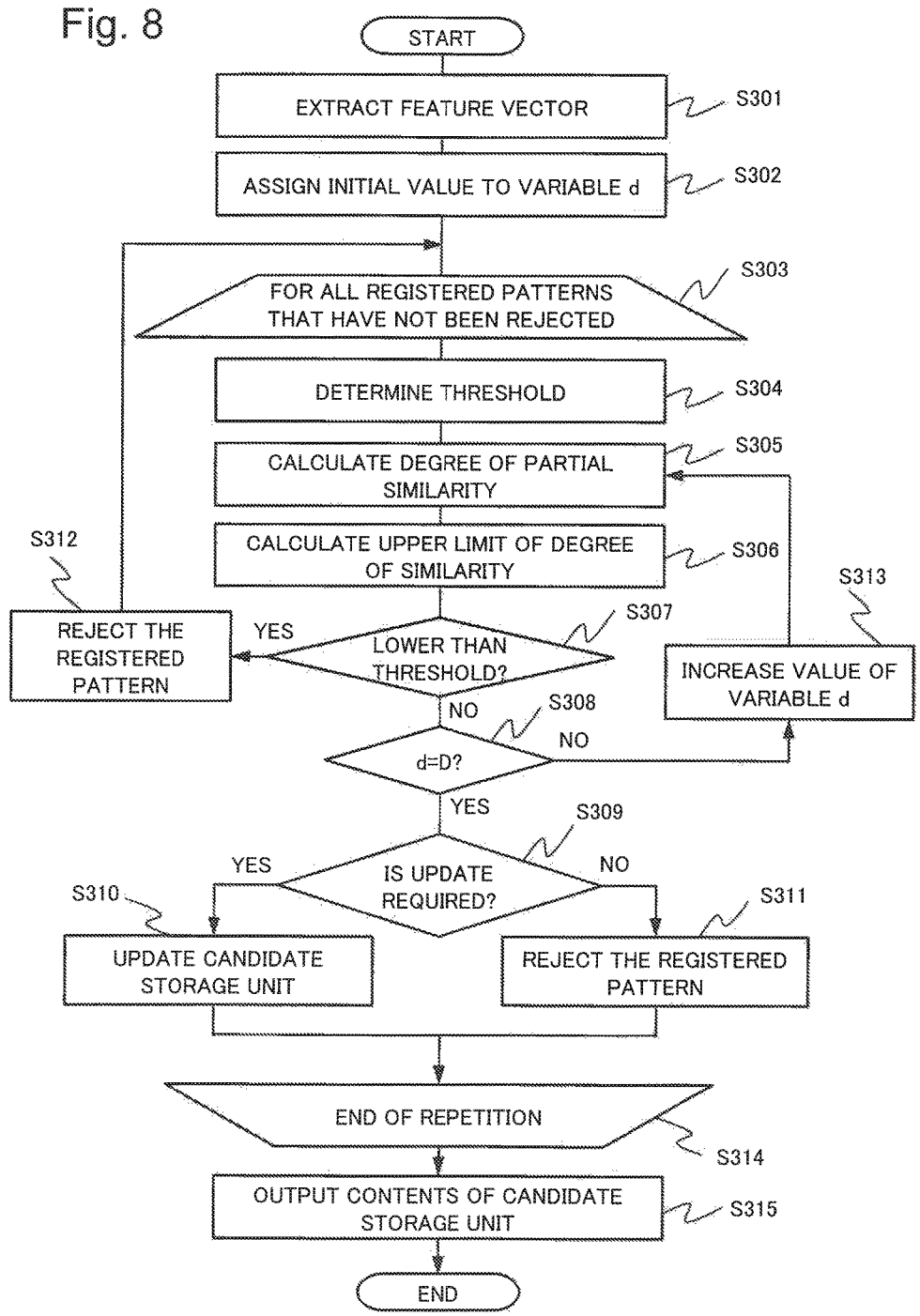
FIG. 8 is a flowchart illustrating an operation of the search system 100 according to specific example 2 of the present invention.

An operation of the search system 100 according to specific example 2 will be described next with reference to the flowchart in FIG. 8. While a plurality of steps are illustrated in sequence in the flowchart in FIG. 8, the steps can be reordered within a scope which does not affect the process.

The feature extraction unit 110 extracts an input vector from an input pattern (step S301). The partial similarity calculation unit 130 assigns an initial value "d0" to the variable "d" (step S302).

The partial similarity calculation unit 130 repeatedly performs the process from step S304 to step S313 for "N" registered vectors stored in the registered pattern storage unit 120 (step S303).

The threshold determination unit 150 chooses, as a threshold, the height of the "K"-th highest degree of similarity among the "K" degrees of similarity stored in the candidate storage unit 170 (step S304). The threshold is the minimum height of the degree of similarity required for a registered vector to be selected as a search result. This is because when the value of "d" is gradually increased and, the value reaches "d=D", "K" registered patterns that have the degrees of similarity higher than the threshold always exists.

The partial similarity calculation unit 130 calculates the degree of partial similarity between the input vector and a registered vector (step S305). The limit calculation unit 140 calculates the upper limit of the degree of similarity and the lower limit of the degree of similarity on the basis of the degree of partial similarity. Alternatively, the limit calculation unit 140 may calculate only the upper limit of the degree of similarity on the basis of the degree of partial similarity (step S306). The rejection decision unit 160 compares the upper limit of the degree of similarity calculated by the limit calculation unit 140 with the threshold determined by the threshold determination unit 150 (step S307).

When the upper limit of the degree of similarity is lower than the threshold (YES at step S307), the rejection decision unit 160 rejects the registered pattern corresponding to the degree of similarity from a candidate for a search result (step S312). The search system 100 ends the process for the rejected registered vector and starts the process for the next registered vector stored in the registered pattern storage unit 120.

When the upper limit of the degree of similarity is not lower than the threshold (NO at step S307), the rejection decision unit 160 does not reject the registered pattern corresponding to the degree of similarity from a candidate for a search result and proceeds to step S308.

When the value of the variable "d" is smaller than "D" (NO at step S308), the partial similarity calculation unit 130 increases the value of the variable "d" (step S313) and repeats the process from step S305 to step S308 for the registered vector.

When the value of the variable "d" is equal to "D" (YES at step S308), the search system 100 proceeds to step S309.

When the height of the degree of similarity calculated at d=D exceeds the height of the degree of similarity of any of the "K" registered vectors recorded in the candidate storage unit 170 (YES at step S309), the rejection decision unit 160 updates the contents stored in the candidate storage unit 170 (step S310).

When the height of the degree of similarity calculated at d=D does not exceed the height of the degree of similarity of any one of the "K" registered vectors recorded in the candidate storage unit 170 (NO at step S309), the rejection decision unit 160 rejects the registered vector (S311).

The partial similarity calculation unit 130, the limit calculation unit 140, the threshold determination unit 150 and the rejection decision unit 160 repeat the process from step S303 to step S311 for each of the N registered vectors stored in the registered pattern storage unit 120 (step S314).

The search system 100 outputs the "K" registered vectors stored in the candidate storage unit 170 as the results of the search (step S315). The operation of the search system 100 according to specific example 2 has been described so far.

Specific Example 3

Specific example 1 uses mathematically precise upper and lower limits on the basis of the nature of inner product whereas specific example 2 uses a mathematically precise upper limit on the basis of the nature of inner product. In specific example 3, those upper and lower limit are relaxed and more narrow range of upper and lower limits are adopted, thereby speed of search becomes more faster. However, in this case, the k-nearest neighbor accuracy rate slightly decreases because the nondegradation of the k-nearest neighbor accuracy rate is approximately guaranteed. Specific example 3 is also applicable to other specific examples which will be described later.

Equation 6 given below represents relaxed upper and lower limits.

$$s_d(x, y) - \alpha \sqrt{\sum_{i=d+1}^{D} x(i)^2} \sqrt{\sum_{i=d+1}^{D} y(i)^2} \leq$$

$$s_D(x, y) \leq s_d(x, y) + \beta \sqrt{\sum_{i=d+1}^{D} x(i)^2} \sqrt{\sum_{i=d+1}^{D} y(i)^2}$$

(Equation 6)

Here, "α" and "β" are constants greater than or equal to 0 but not greater than 1. Both of "α" and "β" are 1 in specific examples 1 and 2. In the present specific example, a vale greater than or equal to 0 but smaller than 1 is set as "α" or "β" to obtain the upper and lower limits in a narrower range. The narrower the range, the faster the search, but the lower the k-nearest neighbor accuracy rate. "α" and "β" may be determined in advance or may be changed adaptively according to the registered pattern. For example, if it is assumed that there is no correlation at remaining dimensions at worst, then α=0. If it is assumed that there is correlation at remaining dimensions that is about the same degree as correlation at the already calculated dimensions at the highest, the value of the factor can be determined adaptively for each registered pattern according to equation 7 given below.

$$\beta = s_d(x, y) \cdot \frac{\sqrt{\sum_{i=1}^{D} x(i)^2} \sqrt{\sum_{i=1}^{D} y(i)^2} - \sqrt{\sum_{i=1}^{d} x(i)^2} \sqrt{\sum_{i=1}^{d} y(i)^2}}{\sqrt{\sum_{i=d+1}^{D} x(i)^2} \sqrt{\sum_{i=d+1}^{D} y(i)^2} \sqrt{\sum_{i=1}^{d} x(i)^2} \sqrt{\sum_{i=1}^{d} y(i)^2}}$$

(Equation 7)

Further, the upper and lower limits of the degree of similarity may be relaxed according to equation 8 given below.

$$\alpha \left( s_d(x, y) - \sqrt{\sum_{i=d+1}^{D} x(i)^2} \sqrt{\sum_{i=d+1}^{D} y(i)^2} \right) \le$$

$$s_D(x, y) \le \beta \left( s_d(x, y) + \sqrt{\sum_{i=d+1}^{D} x(i)^2} \sqrt{\sum_{i=d+1}^{D} y(i)^2} \right)$$

(Equation 8)

Specific Example 4

Specific examples 1 and 2 use inner product as the measure of the degree of similarity whereas specific example 4 uses the square of Euclidean distance as the measure of the degree of similarity. Note that the magnitude relation between the degrees of similarity when distance is used and when the square of distance is used is preserved, therefore specific example 4 will be described with the case that the square of distance is used. In general, the square of the Euclidean distance between vectors "x" and "y" can be decomposed into three inner products as follows.

$$\|x-y\|^2 = x^T x + y^T y - 2x^T y$$

(Equation 9)

Here, the first and second terms of the right-hand side of the equation can be calculated in advance when feature vectors are extracted. Therefore, only the third term needs to be calculated in calculation of the degree of similarity. By using equations 1, 4 and 9, the upper and lower limits of the Euclidean distance can be calculated as follows.

$$x^T x + y^T y - 2 \left( s_d(x, y) + \sqrt{\sum_{i=d+1}^{D} x(i)^2} \sqrt{\sum_{i=d+1}^{D} y(i)^2} \right) \le$$

$$\|x-y\|^2 \le$$

$$x^T x + y^T y - 2 \left( s_d(x, y) - \sqrt{\sum_{i=d+1}^{D} x(i)^2} \sqrt{\sum_{i=d+1}^{D} y(i)^2} \right)$$

(Equation 10)

Therefore, when the square of Euclidean distance is used as the degree of similarity, the upper and lower limits in equation 10 may be used. In this way, the search method by the search system 100 can also be used with the degrees of similarity that are not inner products if the degrees of similarity are based on inner product calculation.

Specific Example 5

While specific examples 1 and 2 use inner product as the measure of the degree of similarity, specific example 5 uses normalized correlation. Generally, the normalized correlation between vectors "x" and "y" can be expressed as follows.

$$\frac{x^T y}{\|x\| \cdot \|y\|} = \left( \frac{x}{\|x\|} \right)^T \left( \frac{y}{\|y\|} \right)$$

(Equation 11)

Therefore, by normalizing norms of feature vectors in advance when features are extracted, the degrees of similarity can be calculated simply by inner product calculation. Thus the present invention can be implemented in the same way as in specific examples 1 and 2. In this way, the search method by the search system 100 can be used with the degrees of similarity that are not inner products, if the degrees of similarity are based on inner product calculation. Specific example 5 has been described so far.

Specific Example 6

Figure 9:
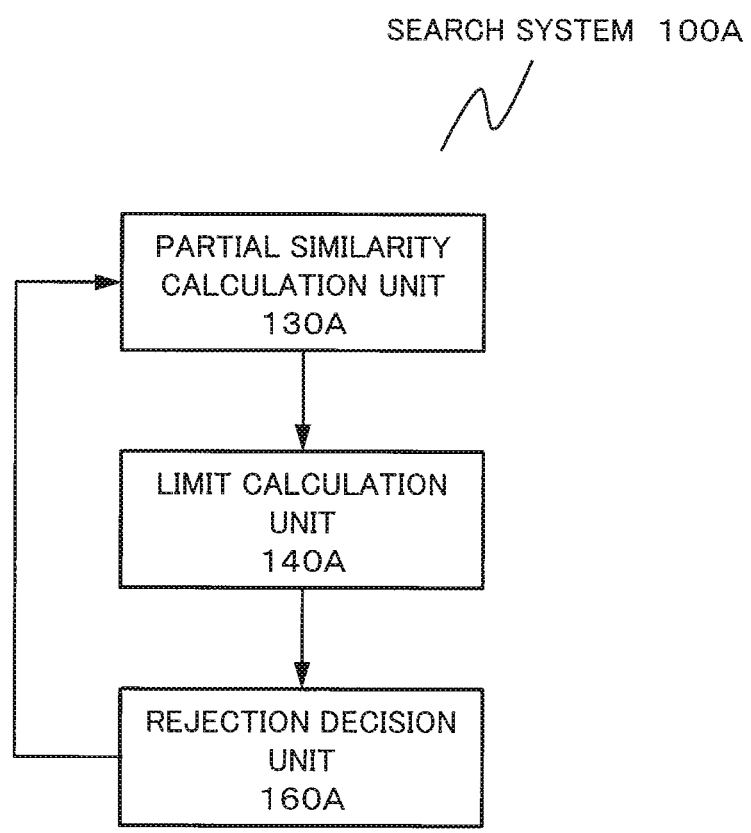
FIG. 9 is a block diagram illustrating a configuration of a search system 100A according to specific example 6 of the present invention.

FIG. 9 is a block diagram illustrating a configuration of a search system 100A according to specific example 6. The search system 100A searches for a registered vector similar to an input vector among a plurality of registered vectors on the basis of the degree of similarity which is a measure of a level of similarity between a vector and another vector. The search system 100A includes a partial similarity calculation unit 130A, a limit calculation unit 140A and a rejection decision unit 160A.

The partial similarity calculation unit 130A calculates the degree of partial similarity which is the degree of similarity concerning some of one or more dimensions of an input vector and a registered vector.

The limit calculation unit 140A calculates, on the basis of the degree of partial similarity, an upper limit of the degree of similarity that is expected when the degree of similarity is calculated.

The rejection decision unit 160A determines, on the basis of the upper limit of the degree of similarity, whether to reject the registered vector that corresponds to the upper limit of the degree of similarity.

Second Exemplary Embodiment

Figure 10:
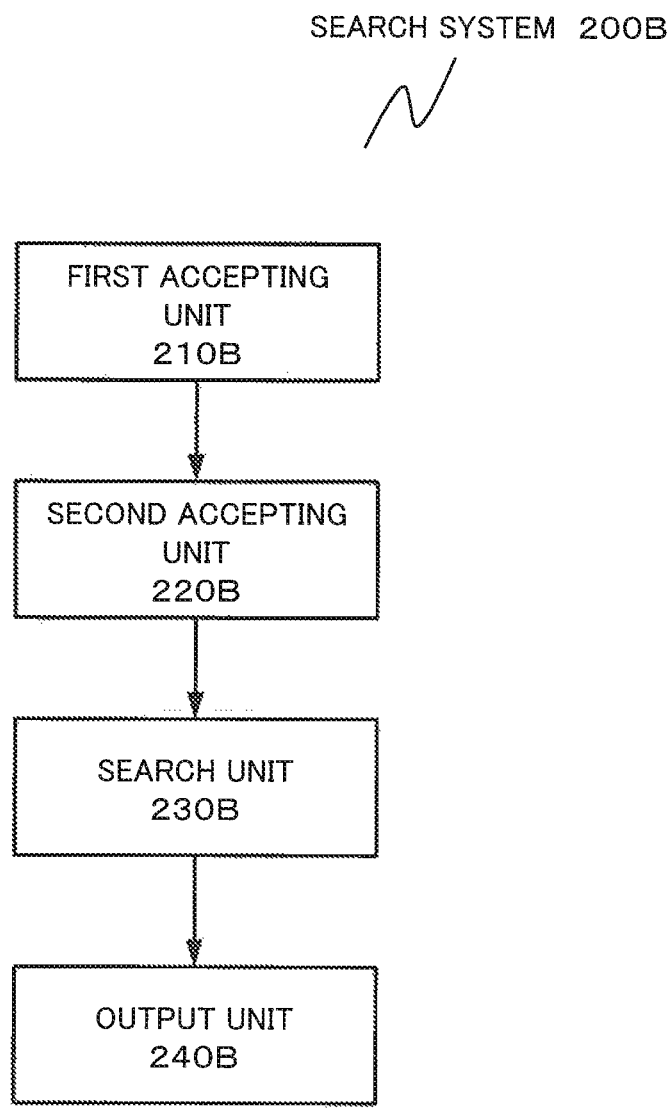
FIG. 10 is a block diagram illustrating a configuration of a search system 200B according to a second exemplary embodiment of the present invention.

FIG. 10 is a block diagram illustrating a configuration of a search system 200B according to a second exemplary embodiment. The search system 200B searches for a registered image that is similar to an input image among a plurality of registered images. As illustrated in FIG. 10, the search system 200B includes a first accepting unit 210B, a second accepting unit 220B, a search unit 230B and an output unit 240B.

The first accepting unit 210B accepts an input image.

The second accepting unit 220B accepts an input of a natural number "K".

The search unit 230B searches for the "K" registered images including the registered image being most similar to the input image to the registered image being "K"-th similar to the input image, among a plurality of registered images. The search unit 230B performs any of the search methods illustrated in specific examples 1 to 5 given above.

The output unit 240B outputs the "K" registered images obtained by the search.

Specifically, the search system 200B searches a database for "K" images that have high degrees of similarity to an input image given as a search condition, and provides the "K" images to a user in the order of similarity.

The exemplary embodiments and specific examples described above can be appropriately combined and implemented.

The configurations of the division of blocks in the block diagrams are configuration represented for convenience of explanations. The present invention described referring the exemplary embodiments as examples is not limited to the configurations illustrated in the block diagrams, as to implementation of the present invention.

Reference signs in the drawings described above are given to the elements for illustrative purposes to facilitate understanding of the present invention and are not intended to limit the present invention to the illustrated modes.

While embodiments for carrying out the present invention have been described, the exemplary embodiments described above are intended to facilitate the understanding of the present invention and are not intended to limit the present invention. The present invention can be modified or improved without departing from the spirit of the present invention and the present invention includes equivalents thereof.

Examples of reference embodiments are given below as supplementary notes.

(Supplemental Note 1)

A search system which is configured to search for a registered vector being similar to an input vector among a plurality of registered vectors on the basis of a degree of similarity which is a measure indicating a level of similarity between an input vector and a registered vector, the search system including:

a partial similarity calculation means for calculating a degree of partial similarity which is the degree of similarity concerning some of one or more dimensions of the input vector and the registered vector;

a limit calculation means for calculating, on the basis of the degree of partial similarity, an upper limit of the degree of similarity that is expected when the degree of similarity is calculated; and a rejection decision means for deciding, on the basis of the upper limit of the degree of similarity, whether or not to reject the registered vector from a candidate for a search result.

(Supplemental Note 2)

The search system according to Supplemental Note 1, wherein the rejection decision means decides whether or not to reject the registered vector from a candidate for a search result by comparing the upper limit of the degree of similarity with a minimum height of the degree of similarity that is required for the registered vector to be selected as a search result.

(Supplemental Note 3)

The search system according to Supplemental Note 1, wherein when "K" registered vectors, including the registered vector being most similar to the input vector to the registered vector being "K"-th similar to the input vector, are searched for among the plurality of registered vectors, the partial similarity calculation means calculates the degree of partial similarity of each of at least "K" registered vectors;

the limit calculation means calculates the upper limit of the degree of similarity and a lower limit of the degree of similarity for each of at least the "K" degrees of partial similarity; and the rejection decision means decides whether or not to reject the registered vector from a candidate for a search result according to a result of comparison between the "K"-th highest lower limit of the degree of similarity among the at least "K" lower limits of the degrees of similarity and the upper limit of the degree of similarity.

(Supplemental Note 4)

The search system according to Supplemental Note 1, further including:

a candidate storage means for storing values of "K" degrees of similarity, including a value of the highest degree of similarity to a value of the "K"-th highest degree of similarity, among at least "K" degrees of similarity each of which is calculated for each of the at least "K" registered vectors, when "K" registered vectors, including the registered vector being most similar to the input vector to the registered vector being "K"-th similar to the input vector, are searched for among the plurality of registered vectors, wherein the rejection decision means decides whether or not to reject the registered vector from a candidate for a search result according to a result of comparison between the value of the K-th highest degree of similarity among the degrees of similarity stored in the candidate storage means and the upper limit of the degree of similarity.

(Supplemental Note 5)

The search system according to Supplemental Note 3 or 4, wherein the limit calculation means calculates the upper limit of similarity or the lower limit of the degree of similarity that is expected when the degree of similarity is calculated, on the basis of the degree of partial similarity and a norm multiplied by a factor greater than or equal to 0 but smaller than or equal to 1, the norm concerning a remaining dimension or dimensions among the plurality of dimensions.

(Supplemental Note 6)

The search system according to Supplemental Note 5, wherein the value of the factor is determined on the basis of a correlation between some of the plurality of dimensions of the input vector and some of the plurality of dimensions of the registered vector.

(Supplemental Note 7)

The search system according to any one of Supplemental Notes 1 to 6, wherein the degree of similarity is a value calculated using all of the dimensions of the input vector and the registered vector; and the limit calculation means calculates the upper limit of the degree of similarity that is expected when the degree of similarity is calculated, on the basis of the degree of partial similarity and the norm concerning a remaining dimension or dimensions among the plurality of dimensions, and the limit calculation means retrieves the square value of a value of each dimension of a vector and calculates a value of the norm concerning the remaining dimension or dimensions using the retrieved value, the square value being calculated in advance when a search process is executed.

(Supplemental Note 8)

The search system according to any one of Supplemental Notes 1 to 7, wherein the degree of similarity is the inner product, Euclidean distance or normalized correlation between the input vector and the registered vector.

(Supplemental Note 9)

A search method performed by a computer which is configured to search for a registered vector similar to an input vector among a plurality of registered vectors on the basis of a degree of similarity which is a measure indicating a level of similarity between an input vector and a registered vector, the search method including:

calculating a degree of partial similarity which is the degree of similarity concerning some of one or more dimensions of the input vector and the registered vector;

calculating, on the basis of the degree of partial similarity, an upper limit of the degree of similarity that is expected when the degree of similarity is calculated; and deciding, on the basis of the upper limit of the degree of similarity, whether or not to reject the registered vector from a candidate for a search result.

(Supplemental Note 10)

A recording medium storing a program for causing a computer which is configured to search for a registered vector similar to an input vector among a plurality of registered vectors on the basis of a degree of similarity which is a measure indicating a level of similarity between an input vector and a registered vector to perform the processing of:

calculating a degree of partial similarity which is the degree of similarity concerning some of one or more dimensions of the input vector and the registered vector;

calculating, on the basis of the degree of partial similarity, an upper limit of the degree of similarity that is expected when the degree of similarity is calculated; and deciding, on the basis of the upper limit of the degree of similarity, whether or not to reject the registered vector from a candidate for a search result.

(Supplemental Note 11)

The search system according to Supplemental Note 7, wherein the partial similarity calculation means calculates anew the degree of partial similarity, with regard to dimensions which is larger than some of one or more dimensions and smaller than all of the dimensions of the registered vector, for the registered vector being not rejected by the rejection decision means, among the plurality of registered vectors.

(Supplemental Note 12)

The search system according to any one of Supplemental Note 1 to 8, wherein the rejection decision means determines whether or not to reject the registered vector from the candidate for the search result, on the basis of the value which is calculated by multiplying a coefficient being 0 or more and 1 or less to the upper limit of the degree of similarity.

(Supplemental Note 13)

The search system according to Supplemental Note 1 to 6, wherein the degree of similarity is a value which is calculated by using all of the dimensions of the input vector and the registered vector;

the limit calculation means calculates the upper limit of the degree of similarity that is expected when the degree of similarity is calculated, on the basis of the degree of partial similarity and the norm concerning a remaining dimension or dimensions among the plurality of dimensions; and the limit calculation means retrieves a value of the norm concerning the remaining dimension or dimensions by retrieving a value being calculated in advance when a search process is executed.

(Supplemental Note 14)

An image search system which is configured to search for a registered image similar to an input image among a plurality of registered images, the image search system including:

a first accepting means for accepting an input image;

a second accepting means for accepting an input of a natural number K;

a search means for searching for the "K" registered images including the registered image being most similar to the input image to the registered image being "K"-th similar to the input image, among the plurality of registered images; and an output means for outputting the "K" registered images.

(Supplemental Note 15)

An image search method performed by a computer which is configured to search for a registered image similar to an input image among a plurality of registered images, the image search method including:

accepting an input image;

accepting an input of a natural number K;

searching for the "K" registered images including the registered image being most similar to the input image to the registered image being "K"-th similar to the input image, among the plurality of registered images; and outputting the "K" registered images.

(Supplemental Note 16)

An recording medium storing a program for causing a computer which is configured to search for a registered image similar to an input image among a plurality of registered images, to perform the processing of:

accepting an input image;

accepting an input of a natural number K;

searching for the "K" registered images including the registered image being most similar to the input image to the registered image being "K"-th similar to the input image, among the plurality of registered images; and outputting the "K" registered images.

INDUSTRIAL APPLICABILITY

The present invention is applicable to applications such as extracting a pattern similar to an input pattern from among patterns registered in a database in image processing or speech processing.

The present invention has been descried by taking the exemplary embodiments described above as model examples. However, the present invention is not limited to the exemplary embodiments described above. Various modes of the present invention which are apparent to those skilled in the art can be employed within the scope of the present invention.

This application is based upon and claims the benefit of priority from Japanese Patent Application No. 2014-023402 filed on Feb. 10, 2014, the entire disclosure of which is incorporated herein.

REFERENCE SIGNS LIST

1 CPU
2 Memory
3 Storage device
4 Communication interface
5 Input device
6 Output device
7 Drive device
8 Storage medium
100 Search system
110 Feature extraction unit
120 Registered pattern storage unit
130 Partial similarity calculation unit
140 Limit calculation unit
150 Threshold determination unit
160 Rejection decision unit
170 Candidate storage unit 100A Search system
130A Partial similarity calculation unit
140A Limit calculation unit
160A Rejection decision unit
200B Search system
210B First accepting unit
220B Second accepting unit
230B Search unit
240B Output unit

What is claimed is:

1. A search system which is configured to perform a search for a plurality of "K" registered vectors which comprise a registered vector being most similar to an input vector and a registered vector being "K-th" most similar to the input vector, from among a plurality of registered vectors based on a degree of similarity which is a measure indicating a level of similarity between an input vector and a registered vector, the search system comprising:
a memory; and
a processor coupled to the memory and configured to:
calculate, with respect to each of one or more registered vectors from among the plurality of registered vectors, one or more degrees of partial similarity, each of the one or more degrees of partial similarity being a degree of partial similarity which is a similarity between a portion of the input vector and a portion of each of the one or more registered vectors;
determine a threshold based on:
a value of a "K-th" highest lower limit degree of similarity from among "K" or more lower limits of degrees of similarity, each of the "K" or more lower limits of degrees of similarity being calculated with respect to each of "K" or more registered vectors from among the plurality of registered vectors based on the degree of partial similarity of each of the "K" or more registered vectors and being a lower limit of possible values of an expected degree of similarity; or
a value of "K-th" highest degree of similarity from among "K" or more degrees of similarity which are calculated with respect to "K" or more registered vectors among the plurality of registered vectors; and
perform, with respect to at least one registered vector, from among the plurality of registered vectors:
calculation of an upper limit of the degree of similarity which is an upper limit of possible values of expected degree of similarity, the calculation being based on the degree of partial similarity of the registered vector;
comparison of the upper limit of the registered vector with the determined threshold; and
determination, based on the comparison of whether to exclude the registered vector from a plurality of candidates for a result of the search.

2. The search system according to claim 1, wherein the processor is further configured to exclude the registered vector from the plurality of candidates when the upper limit of the degree of similarity is smaller than the determined threshold.

3. The search system according to claim 1, wherein the processor is further configured to:
calculate the degree of partial similarity of each of at least "K" registered vectors;
calculate the upper limit of the degree of similarity and the lower limit of the degree of similarity with respect to each of the plurality of "K" or registered vectors; and
determined, as the threshold, the value of the "K"-th highest lower limit of the degree of similarity from among the "K" or more lower limits of degrees of similarity.

4. The search system according to claim 1, further comprising
a candidate storage configured to store values of the "K" or more degrees of similarity which include a value of a highest degree of similarity to a value of a "K"-th highest degree of similarity from among degrees of similarity that are already calculated,
wherein the processor is further configured to determine, as the threshold, the value of the "K-th" highest degree of similarity stored in the candidate storage.

5. The search system according to claim 3,
wherein the processor is further configured to calculate the upper limit or the lower limit based on
the degree of partial similarity and a norm multiplied by a factor greater than or equal to 0 but smaller than or equal to 1, the norm concerning dimensions of a portion other than the portion used for the calculation of the degree of partial similarity.

6. The search system according to claim 5,
wherein the value of the factor is determined on the basis of a correlation between the portion of the input vector and the portion of the registered vector.

7. The search system according to claim 1,
wherein the degree of similarity is a value calculated using all dimensions of the input vector and the registered vector; and
the processor is further configured to:
calculate the upper limit of the degree of similarity based on the degree of partial similarity and a norm concerning remaining dimensions from among all dimensions; and
retrieve a square value of a value of each dimension of the input vector or the registered vector a vector and calculate a value of the norm concerning the remaining dimensions using the retrieved square value, the square value being calculated in advance when the search is executed.

8. The search system according to claim 1,
wherein the degree of similarity is an inner product, Euclidean distance or normalized correlation between the input vector and the registered vector.

9. A search method performed by a computer which is configured to perform a search for a plurality of "K" registered vectors which comprise a registered vector being most similar to an input vector and a registered vector being "K-th" most similar to the input vector, from among a plurality of registered vectors, based on a degree of similarity which is a measure indicating a level of similarity between an input vector and a registered vector, the search method comprising:
calculating, with respect to each of one or more registered vectors from among the plurality of registered vectors, one or more degrees of partial similarity, each of the one or more degrees of partial similarity being a degree of partial similarity which is a similarity between a portion of the input vector and a portion of each of the one or more registered vectors;
determining a threshold based on:
a value of a "K-th" highest lower limit degree of similarity from among "K" or more lower limits of degrees of similarity, each of the "K" or more lower limits of degrees of similarity being calculated with respect to each of "K" or more registered vectors from among the plurality of registered vectors based on the degree of partial similarity of each of the "K" or more registered vectors and being a lower limit of possible values of an expected degree of similarity; or a value of "K-th" highest degree of similarity from among "K" or more degrees of similarity which are calculated with respect to "K" or more registered vectors among the plurality of registered vectors; and performing, with respect to at least one registered vector, from among the plurality of registered vectors:

calculation of an upper limit of the degree of similarity which is an upper limit of possible values of expected degree of similarity, the calculation being based on the degree of partial similarity of the registered vector;

comparison of the upper limit of the registered vector with the determined threshold; and determining, based on the comparison of whether or not to exclude the registered vector from a plurality of candidates for a result of the search.

10. A non-transitory recording medium storing a program for causing a computer to perform a search method for a plurality of "K" registered vectors which comprise a registered vector being most similar to an input vector and a registered vector being "K-th" most similar to the input vector, from among a plurality of registered vectors based on a degree of similarity which is a measure indicating a level of similarity between an input vector and a registered vector, the search method comprising:

calculating, with respect to each of one or more registered vectors from among the plurality of registered vectors, one or more degrees of partial similarity, each of the one or more degrees of partial similarity being a degree of partial similarity which is a similarity between a portion of the input vector and a portion of each of the one or more registered vectors;

determining a threshold based on:

a value of a "K-th" highest lower limit degree of similarity from among "K" or more lower limits of degrees of similarity, each of the "K" or more lower limits of degrees of similarity being calculated with respect to each of "K" or more registered vectors from among the plurality of registered vectors based on the degree of partial similarity of each of the "K" or more registered vectors and being a lower limit of possible values of an expected degree of similarity; or a value of "K-th" highest degree of similarity from among "K" or more degrees of similarity which are calculated with respect to "K" or more registered vectors among the plurality of registered vectors; and performing, with respect to at least one registered vector, from among the plurality of registered vectors:

calculation of an upper limit of the degree of similarity which is an upper limit of possible values of expected degree of similarity, the calculation being based on the degree of partial similarity of the registered vector;

comparison of the upper limit of the registered vector with the determined threshold; and determining, based on the comparison of whether or not to exclude the registered vector from a plurality of candidates for result of the search.

* * * * *